United States Patent
Jo et al.

(10) Patent No.: US 9,858,490 B2
(45) Date of Patent: Jan. 2, 2018

(54) VEIN AUTHENTICATION METHOD, IMAGE PROCESSING METHOD, AND VEIN AUTHENTICATION DEVICE

(71) Applicant: FUJITSU LIMITED, Kawasaki-shi, Kanagawa (JP)

(72) Inventors: Yuka Jo, Kawasaki (JP); Soichi Hama, Atsugi (JP); Mitsuaki Fukuda, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 537 days.

(21) Appl. No.: 14/299,435

(22) Filed: Jun. 9, 2014

(65) Prior Publication Data
US 2014/0294251 A1    Oct. 2, 2014

Related U.S. Application Data

(63) Continuation of application No. PCT/JP2011/079100, filed on Dec. 15, 2011.

(51) Int. Cl.
G06K 9/00    (2006.01)

(52) U.S. Cl.
CPC ..... G06K 9/00885 (2013.01); G06K 9/00033 (2013.01); G06K 2009/00932 (2013.01)

(58) Field of Classification Search
CPC .......... G06K 9/00033; G06K 9/00885; G06K 2009/00932
See application file for complete search history.

(56) References Cited

U.S. PATENT DOCUMENTS 6,088,470 A    7/2000    Camus et al.
6,850,872 B1    2/2005    Marschner et al.
(Continued)

FOREIGN PATENT DOCUMENTS

JP    2001-224549    8/2001
JP    2002-501265    1/2002
(Continued)

OTHER PUBLICATIONS

Machine translation of Takiguchi et al (JP 2003-150962).*
(Continued)

*Primary Examiner* — Edward Park
(74) *Attorney, Agent, or Firm* — Fujitsu Patent Center (57) ABSTRACT

A vein authentication device converts pixel values of an image, which captures an authentication site including veins, into frequency components. Moreover, the vein authentication device performs filtering of the frequency components, which are obtained by conversion of the pixel values, using a filter stored in a filter storing unit for reducing frequency components, from among low-frequency components having a lower spatial frequency than the spatial frequency of the veins and high-frequency components having a higher spatial frequency than the spatial frequency of the veins, corresponding to surface reflection of an illumination used for the authentication site. Furthermore, the vein authentication device converts the frequency components, which are subjected to filtering, back into an image. Moreover, the vein authentication device extracts vein data representing a vascular pattern of veins from the image obtained by reverse conversion. Furthermore, the vein authentication device performs vein authentication using the vein data that is extracted.

7 Claims, 7 Drawing Sheets

(56) References Cited

U.S. PATENT DOCUMENTS

| | | | |
|---|---|---|---|
| 2002/0138008 A1 | 9/2002 | Tsujita et al. | |
| 2003/0086592 A1 | 5/2003 | Takiguchi et al. | |
| 2004/0228538 A1* | 11/2004 | Onuma | H04N 19/176 |
| | | | 382/239 |
| 2010/0195736 A1* | 8/2010 | Haseyama | H04N 19/51 |
| | | | 375/240.16 |
| 2010/0278397 A1 | 11/2010 | Tobe et al. | |
| 2012/0014570 A1 | 1/2012 | Abe | |

FOREIGN PATENT DOCUMENTS

| | | | |
|---|---|---|---|
| JP | 2002-112970 | | 4/2002 |
| JP | 2002-133446 | | 5/2002 |
| JP | 2002-514098 | | 5/2002 |
| JP | 2002-200050 | | 7/2002 |
| JP | 2003-150962 | * | 5/2003 |
| JP | 2008-198083 A | | 8/2008 |
| JP | 2008198083 A | * | 8/2008 |
| JP | 2009-059249 | | 3/2009 |
| WO | 1998-008439 | | 3/1998 |
| WO | 2010-119500 | | 10/2010 |

OTHER PUBLICATIONS

Machine translation of Hideto (JP 2008-198083 A).*
Japanese Office Action dated Aug. 18, 2015 for corresponding Japanese Patent Application No. 2013-549035, with Partial English Translation, 6 pages.
International Search Report, mailed in connection with PCT/JP2011/079100 and dated Mar. 19, 2012.

* cited by examiner

VEIN AUTHENTICATION METHOD, IMAGE PROCESSING METHOD, AND VEIN AUTHENTICATION DEVICE

CROSS-REFERENCE TO RELATED APPLICATION

This application is a continuation of International Application No. PCT/JP2011/079100, filed on Dec. 15, 2011, the entire contents of which are incorporated herein by reference.

FIELD

The embodiments discussed herein are related to a vein authentication method, an image processing method, and a vein authentication device.

BACKGROUND

Vein authentication is known to be one of the modes of the biometrics authentication technology. While performing vein authentication, a palm of the subject to be authenticated is irradiated with infrared light, and the reflected infrared light from the surface of the palm or from the inside of the palm is captured using a camera.

In the case of implementing the reflection-type imaging technique for capturing the veins; not only the diffuse reflection light that captures information about the veins falls on the lens of the camera, but also the specular reflection light that captures information about the surface of the palm also falls on the lens of the camera.

Figure 7:
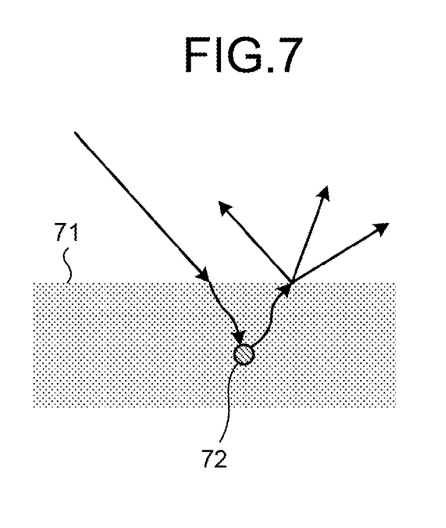
FIG. 7 is a diagram for explaining diffuse reflection.

FIG. 7 is a diagram for explaining diffuse reflection. In the example illustrated in FIG. 7, arrows represent the light paths of the infrared light emitted from a light source. As illustrated in FIG. 7, as far as the diffuse reflection light is concerned, the infrared light emitted from the light source penetrates through a palm 71 and diffuses in repeating fashion before coming out to the surface of the palm 71. At that time, the angle of reflection of the infrared light is not dependent on the angle of incidence; and the light falling on the inside of the palm 71 is uniformly reflected in all directions. Regarding that diffuse reflection light, the light of only a specific wavelength is absorbed by the reduced hemoglobin present in the blood. As a result, only from the portion covered by a vein 72, the light comes back at a weaker intensity as compared to the intensity at the time of emission. For that reason, in an image in which the diffuse reflection light is captured, the vein 72 appears dark. In this way, as a result of capturing the diffuse reflection light, the vascular pattern of veins becomes visible.

Figure 8:
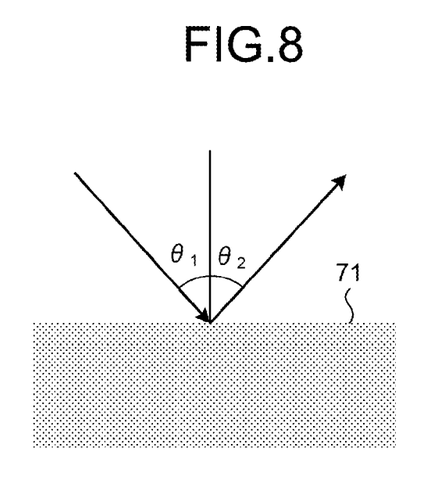
FIG. 8 is a diagram for explaining specular reflection.

FIG. 8 is a diagram for explaining specular reflection. In the example illustrated in FIG. 8 too, arrows represent the light path of the infrared light emitted from a light source. As illustrated in FIG. 8, as far as the specular reflection light is concerned, the infrared light emitted from the light source is reflected from the surface of the palm 71 and comes back. At that time, since the direction of the light path is preserved due to surface reflection, an angle of incidence $\theta_1$ and an angle of reflection $\theta_2$ are identical to each other. However, the information about the inside of the palm 71 is not included in this surface reflection. Not only that, the patterns such as the wrinkles present on the surface of the palm 71 are captured, thereby obscuring the information about the veins that is obtained due to the diffuse reflection light. Sometimes, such surface reflection causes interference to the authentication.

Exemplary methods for reducing the effect of such surface reflection are as follows. For example, in a first method, the light source is placed at a sufficiently distant position from the camera with the aim of increasing the angle of reflection, and the specular reflection light is prevented from falling on the camera. In a second method, polarized light is emitted, and a polarization filter is disposed in front of the camera with the aim of cutting polarization in the same direction as the direction of polarized light. With that, the specular reflection light is removed. In a third method, a plurality of images is taken while changing the illumination; and the reflection-free portions in the images are synthesized. In a fourth method, a low-pass filter is applied to endoscopic images, and filtered reflection images are obtained. These related-art examples are described, for example, in Japanese Laid-open Patent Publication No. 2002-112970, Japanese Laid-open Patent Publication No. 2002-200050, Japanese National Publication of international Patent Application No. 2002-501265, Japanese Laid-open Patent Publication No. 2002-133446, Japanese National Publication of international Patent Application No. 2002-514098, and Japanese Laid-open Patent Publication No. 2001-224549

However, in the conventional technology described above, in order to reduce the effect of surface reflection, the device scale or the manufacturing cost gets sacrificed as explained below.

For example, in the first method, there is a limitation to increasing the distance between the position of the camera and the position of the light source. Hence, by increasing the installation area of the device, the device scale becomes bloated. In the second method, since a polarization filter needs to be disposed in the camera, there occurs an increase in the manufacturing cost. Not only that, because of the polarization filter, there occurs an increase in the attenuation rate of the light falling on the camera. As a result, the image quality undergoes deterioration or the power consumption of the illumination goes higher. In the third method, a plurality of illuminations or a plurality of camera are used. That leads to an increase in the manufacturing cost and bloating of the device scale. Besides, the imaging time of images becomes lengthy too. In the fourth embodiment, the low-pass filter is usable only for endoscopic images and does nothing more than performing filtering of reflected images of the illumination that appears on a smooth surface such as that of internal organs. Hence, such a low-pass filter is not applicable to images that capture a palm having a complex diffusing surface.

In a vein authentication method laid open in this application, a computer executes an operation of converting pixel values of an image, which captures an authentication site including veins, into frequency components. Moreover, in the vein authentication method, the computer performs an operation of filtering the frequency components, which are obtained by conversion of the pixel values, using a filter stored in a filter storing unit which is used to store a filter for reducing frequency components, from among low-frequency components having a lower spatial frequency than the spatial frequency of the veins and high-frequency components having a higher spatial frequency than the spatial frequency of the veins, corresponding to surface reflection of an illumination used for the authentication site. Furthermore, in the vein authentication method, the computer performs an operation of converting the frequency components, which are subjected to filtering, back into an image. Moreover, in the vein authentication method, the computer performs an operation of extracting vein data, which represents a vascular pattern of veins, from the image obtained by reverse conversion. Furthermore, in the vein authentication method, the computer performs an operation of performing vein authentication using the vein data that is extracted.

SUMMARY

According to an aspect of an embodiment, a vein authentication method includes: converting, using a processor, pixel values of an image, which captures an authentication site including veins, into frequency components; filtering, using the processor, the frequency components, which are obtained by conversion of the pixel values, according to a filter stored in a filter storing unit which is used to store a filter for reducing frequency components, from among low-frequency components having a lower spatial frequency than the spatial frequency of the veins and high-frequency components having a higher spatial frequency than the spatial frequency of the veins, corresponding to surface reflection of an illumination used for the authentication site; reverse-converting, using the processor the frequency components, which are subjected to filtering, back into an image; extracting, using the processor, vein data, which represents a vascular pattern of veins, from the image obtained at the reverse-converting; and performing, using the processor, vein authentication using the vein data that is extracted.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. However, the vein authentication method, the image processing method, and the vein authentication device laid open in this application are not limited to the embodiments described below. Moreover, the embodiments can be appropriately combined without causing a contradiction in the operation contents.

[a] First Embodiment

Configuration of Vein Authentication Device

Figure 1:
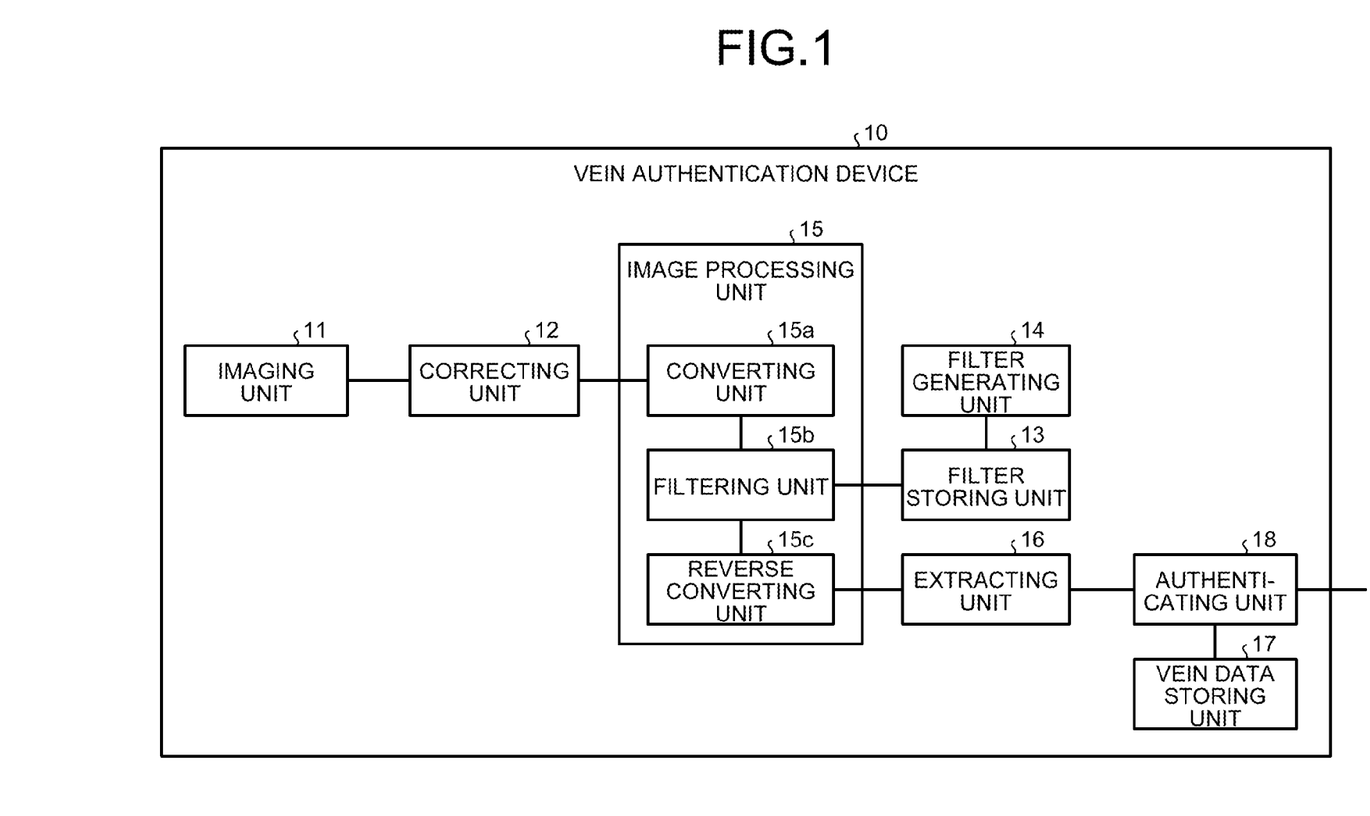
FIG. 1 is a block diagram illustrating a functional configuration of a vein authentication device according to a first embodiment.

FIG. 1 is a block diagram illustrating a functional configuration of a vein authentication device according to a first embodiment. A vein authentication device 10 illustrated in FIG. 1 performs vein authentication by matching vein data extracted from a palm image, which captures the veins of a palm of a user, with vein data registered in advance.

As illustrated in FIG. 1, the vein authentication device 10 includes an imaging unit 11, a correcting unit 12, a filter storing unit 13, a filter generating unit 14, an image processing unit 15, an extracting unit 16, a vein data storing unit 17, and an authenticating unit 18. Moreover, apart from the functional units illustrated in FIG. 1, the vein authentication device 10 can also include various functional units of a known computer. For example, the vein authentication device 10 can be equipped with the functions of various input devices, voice output devices, and communication interfaces.

The imaging unit 11 is a processing unit that takes images of an authentication site. As one mode, the imaging unit 11 is configured with illumination that emits infrared light having a suitable wavelength for the purpose of reflecting vascular pattern of veins present inside a palm; and a camera that is capable of capturing the infrared light. The imaging unit 11 can either be a contact-type imaging unit or a contactless-type imaging unit. As an example, when a palm approaches the imaging unit 11 or when a palm is placed on a predetermined imaging position, the palm gets irradiated by the infrared light emitted from the illumination. Then, the camera that is activated in conjunction with the emission of the infrared light captures the infrared light reflected from the surface of the palm or from the inside of the palm. In the following explanation, an image that is taken by the imaging unit 11 and that captures a palm is sometimes called a "palm image". Meanwhile, herein, it is assumed that a palm serves as the authentication site including veins. However, it is also possible to use the back of a hand as the authentication site.

The correcting unit 12 is a processing unit that corrects the position, the tilt, and the size of a palm image that is taken by the imaging unit 11. As one mode, the correcting unit 12 performs position adjustment in such a way that the imaging position at which the imaging unit 11 takes a palm image is substantially identical to the imaging position at which a palm image is taken at the time of extraction of the vein data registered in the vein data storing unit 17.

As far as the position adjustment is concerned, it is possible to implement a known technology such as the technology disclosed in Japan Patent Application Laid-open No. 2010-152706. Regarding that technology, with respect to a vein image or a contour image extracted from a palm image taken by the imaging unit 11, the correcting unit 12 performs parallel shifting, rotation, and enlargement or reduction. Besides, the correcting unit 12 searches for the amount of shift, the amount of rotation, and the enlargement factor of a vein image or a contour image that has the maximum resemblance among the vein images or the contour images related to each set of vein data registered in the vein data storing unit 17. As a result, position adjustment can be performed even in the case in which, with respect to the imaging position at which a palm image is captured at the time of registering the vein data in the vein data storing unit 17, the imaging position at which the imaging unit 11 takes a palm image is not aligned in the vertical direction or the horizontal direction, or is placed in an obliquely tilted manner, or is placed either distantly or nearby.

The filter storing unit 13 is a memory unit that is used to store a surface reflection reduction filter that enables achieving reduction in the surface-reflection-related components from a palm image. As an example, in the filter storing unit 13, a surface reflection reduction filter is registered upon being generated by the filter generating unit 14 (described later). Herein, although it is assumed that a surface reflection reduction filter is generated by the filter generating unit 14 (described later) before being registered; it is also possible to obtain a surface reflection reduction filter from an external device via a network or to read a surface reflection reduction filter from an external memory device. As another example, the filter storing unit 13 is referred to by a filtering unit 15b (described later) for the purpose of performing a filtering operation with respect to a palm image that serves as an original image taken by the imaging unit 11.

The filter generating unit 14 is a processing unit that generates a surface reflection reduction filter. As one mode, the filter generating unit 14 generates, as the filter, a coefficient matrix that removes low-frequency components corresponding to the surface reflection which is unevenly distributed at a specific position of the palm, that is, removes low-frequency components corresponding to what is called "shine"; as well as removes high-frequency components corresponding to the patterns on the palm that are visible due to the surface reflection. Herein, "low-frequency components" indicate the frequency components which have a lower spatial frequency than the spatial frequency of the width of the venous vessels; while "high-frequency components" indicate the frequency components which have a higher spatial frequency than the spatial frequency of the width of the venous vessels.

Firstly, the explanation is given about the low-frequency components that are to be reduced from a palm image. In regard to that, since the surface reflection points to reflected light of specular reflection from the surface of a palm, the reflected light has a property (1) that the positions of incidence on the camera are unevenly distributed within the palm. Moreover, the spatial frequency that corresponds to the surface reflection, which is unevenly distributed within the palm, is dependent on the positional relationship between the camera and the illumination as well as dependent on the shape of the palm.

Figure 2:
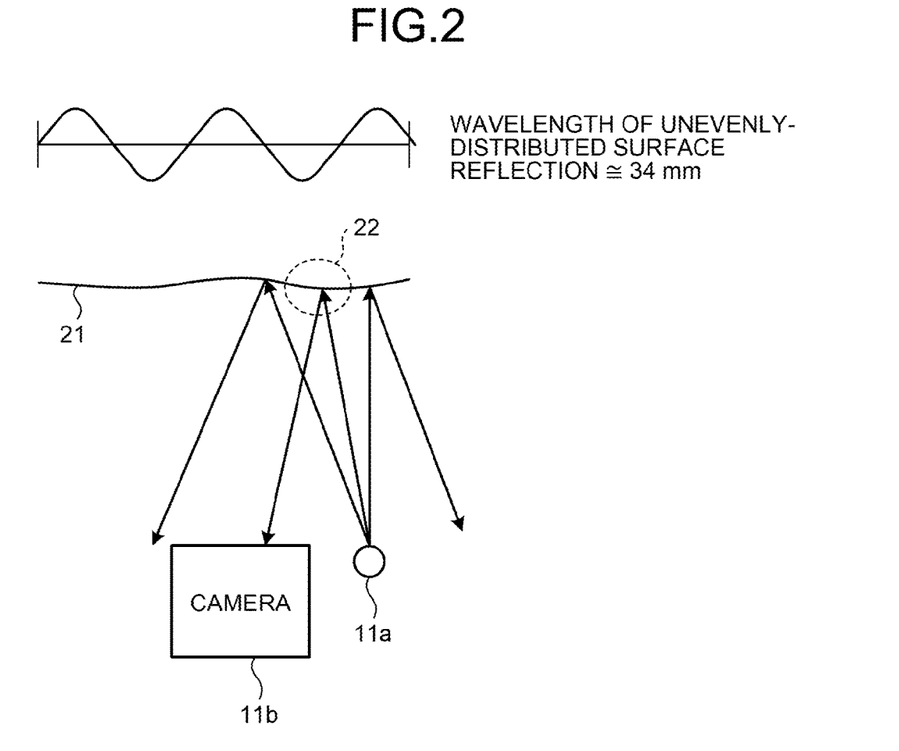
FIG. 2 is a diagram for explaining the uneven distribution of surface reflection from a palm.

For example, under the premise that a palm having the common shape is the target for imaging; if the imaging unit 11 is to be downsized, that is, if the illumination and the camera are to be placed close to each other; then it is desirable that the low-frequency components in the wavelength band from 28 mm to 71 mm are cut down from the palm image. FIG. 2 is a diagram for explaining the uneven distribution of surface reflection from a palm. With reference to FIG. 2, it is assumed that an illumination 11a and a camera 11b are placed at a distance of 2 cm from each other. In FIG. 2 is illustrated an example in which, with respect to a palm 21 having the width of 84 mm, the surface reflection which is unevenly distributed within the palm 21 has the wavelength of 34 mm. Moreover, in FIG. 2, an area 22 represents a range within which the surface reflection falls on the camera 11b.

However, the low-frequency components in the wavelength band from 28 mm to 71 mm also include components that express the contour of the palm. For that reason, if all of the low-frequency components in the wavelength band from 28 mm to 71 mm are removed, then sometimes the contour of the palm gets blurred in a palm image that is already subjected to filtering. Hence, from the perspective of removing the shine while maintaining the contour of the palm in a palm image, it is desirable to do the filter settings in such a way that not all of the low-frequency components in the wavelength band from 28 mm to 71 mm are removed and some of the low-frequency components, such as about 20% of the low-frequency components, are retained.

Given below is the explanation of the high-frequency components that are to be reduced from a palm image. In regard to that, the surface reflection has a property (2) of reflecting patterns such as the wrinkles present on the surface of the palm. Such patterns present on the surface of the palm have a higher spatial frequency than the spatial frequency of the width of the venous vessels. That is, the wrinkles on a palm have the width equivalent to or severalfold of the fingerprint pattern. The width of the fingerprint pattern is in the range of about 0.1 mm to 0.15 mm. In comparison, the width of the venous vessels is in the range of about 1 mm to 2 mm. Thus, there is a difference of more than twice between the patterns on the palm and the veins. Hence, the patterns on the palm are sufficiently differentiable from the veins, and the high-frequency components corresponding only to the patterns on the surface of the palm can be reduced. Besides, according to the sampling theorem, if the wavelength band to be reduced is set to be equal to or smaller than 1.0 mm that is half of the wavelength corresponding to the width of the venous vessels; it also becomes possible to curb the effect caused on the vein data by reducing the high-frequency components corresponding to the wrinkles on the surface of the palm.

In this way, in the vein authentication device 10 according to the first embodiment, as the surface reflection reduction filter, a coefficient matrix is generated that removes the low-frequency components corresponding to the surface reflection which is unevenly distributed at a specific position of the palm; as well as removes the high-frequency components corresponding to the patterns on the palm which are visible due to the surface reflection.

Figure 3:
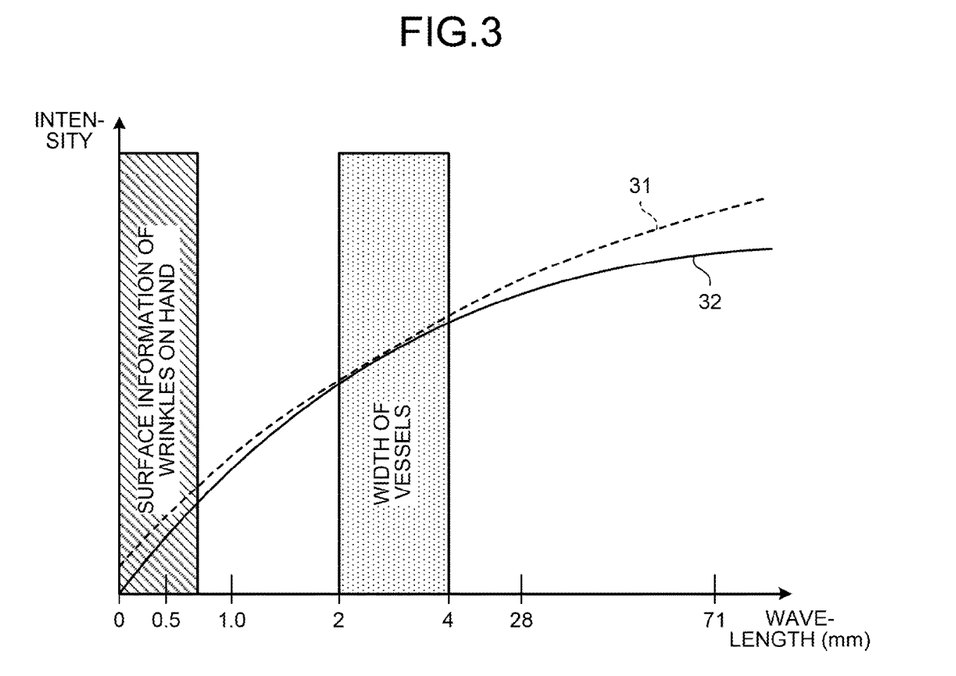
FIG. 3 is a diagram illustrating an example of frequency distribution of palm images.

FIG. 3 is a diagram illustrating an example of frequency distribution of palm images. In the graph illustrated in FIG. 3, the horizontal axis represents the wavelength (mm) and the vertical axis represents the intensity. Moreover, with reference to FIG. 3, a frequency distribution 31 is the frequency distribution of a palm image including surface reflection, and a frequency distribution 32 is the frequency distribution of a palm image not including surface reflection. As illustrated in FIG. 3, when the surface reflection reduction filter is applied to the palm image serving as the original image, the frequency distribution 31 of the palm image including surface reflection is brought near to the frequency distribution 32 of the palm image not including surface reflection.

Given below is the explanation about generating the surface reflection reduction filter. As an example, in each element of a coefficient matrix having the same size as the size of a palm image serving as an original image, the filter generating unit 14 sets a coefficient a that is assigned for each section corresponding to a distance d from the center of the coefficient matrix to that element. In the following explanation, it is assumed that the original image has the size equal to n×n pixels (n=512) and the palm captured in an image has the width of about 300 pixels. Herein, although the explanation is given for an example in which the original image is square in shape, the applicable scope of the device laid open in this application is not limited to the abovementioned example. Alternatively, the original image may be rectangular in shape and having the size equal to m×n pixels.

In regard to that, the filter generating unit 14 calculates the distance d which corresponds to the wavelength serving as a boundary value of each section from a section A to a section D that determine the shape of the filter. The abovementioned "distance d" is proportional to the frequency but is inversely proportional to the wavelength. With respect to an element (i, j) of a coefficient matrix F that is a frequency matrix, the distance d is represented as given below in Equation (1). Meanwhile, in Equation (1) given below, "sqrt(x)" represents the square root of x.

$$d=\text{sqrt}[\{i-(n+1)/2\}^2+\{j-(n+1)/2\}^2] \tag{1}$$

Figure 4:
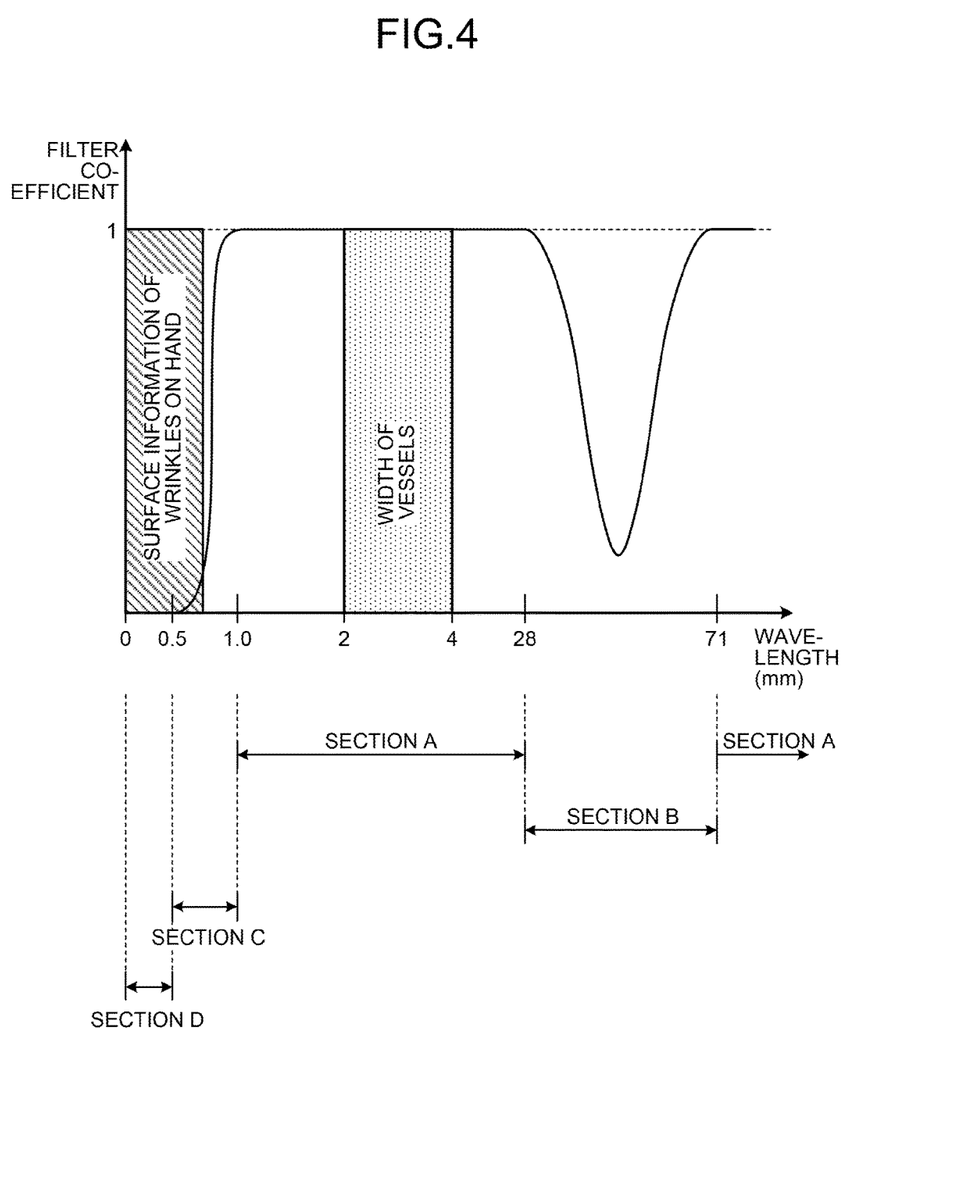
FIG. 4 is a diagram illustrating an example of a surface reflection reduction filter.

For example, as a boundary value of each section from the section A to the section D, a wavelength λ illustrated in FIG. 4 is used based on the property (1) and the property (2) described above. Herein, FIG. 4 is a diagram illustrating an example of the surface reflection reduction filter. In the graph illustrated in FIG. 4, the horizontal axis represents the wavelength (mm) and the vertical axis represents the filter coefficient. As illustrated in FIG. 4, in the section A; the wavelength of 1.0 mm, the wavelength of 28 mm, and the wavelength 71 mm are set as the boundary values. Herein, it is defined that 1.0 mm<λ≤28 mm or 71 mm<λ are satisfied. In the section B, the wavelength of 28 mm and the wavelength of 71 mm are set as the boundary values. Herein, it is defined that 28 mm<λ≤71 mm is satisfied. In the section C, the wavelength of 0.5 mm and the wavelength of 1.0 mm are set as the boundary values. Herein, it is defined that 0.5 mm<λ≤1.0 mm is satisfied. In the section D, the wavelength of 0.5 mm is set as the boundary value. Herein, it is defined that λ≤0.5 mm is satisfied.

In regard to the calculation of the distance d mentioned above, the following explanation is given about the relationship between the distance d and the wavelength λ. For example, if the wavelength expressed in mm is termed "λ" and if the wavelength expressed in pixels is termed "λ'"; then the wavelength "λ" and the wavelength "λ'" are proportional to each other. The proportionality coefficient of the wavelength "λ" and the wavelength "λ'" is expressed as the ratio of the number of pixels, from among all pixels, corresponding to the portion including a photographic subject to the plain scale of that portion. At that time, if it is assumed that the plain scale of 1 mm on the palm corresponds to k number of pixels in an image, then the relationship can be expressed in Equation (2) given below.

$$\lambda=\lambda'/k \tag{2}$$

For example, as illustrated earlier, when a palm has the width of 84 mm and when that palm captured in an image has the width of 300 pixels, then the proportionality factor k is calculated to be equal to "3.6" by substituting λ=300 pixels and λ'=84 mm in Equation (2) given above.

Moreover, the relationship between the distance d and the wavelength λ' can be expressed with Equation (3) given below using an image size n. Consequently, if the wavelength λ' in Equation (3) given below is substituted with "λ'=λk" obtained by modifying Equation (2) given above, then Equation (4) can be obtained as given below.

$$n=d\lambda' \tag{3}$$

$$d=n/(k\lambda) \tag{4}$$

For example, when the image size n=512 and the proportionality factor k=3.6 (pixel/mm) are set; if the distance d is calculated corresponding to the wavelength λ=71 mm that is a boundary value of the section A; the filter generating unit 14 performs calculation by substituting the image size n, the proportionality coefficient k, and the wavelength λ. As a result, the filter generating unit 14 can calculate "2" as the distance d corresponding to the wavelength λ=71 mm. In an identical manner, the filter generating unit 14 can calculate the distance d corresponding to each other wavelength λ serving as a boundary value of the section A. Moreover, the filter generating unit 14 can calculate the distance d corresponding to each wavelength λ serving as a boundary value of each of the section B to the section D.

Then, the filter generating unit 14 generates an empty coefficient matrix F having the same size as the size of the original image. Then, using Equation (1) given above, the filter generating unit 14 calculates the distance d from the center of the coefficient matrix F to an element (i, j) of the coefficient matrix F.

In addition, the filter generating unit 14 identifies the section from among the section A to the section D to which the calculated distance d corresponds. Then, in the element (i, j) of the coefficient matrix F, the filter generating unit 14 sets the filter coefficient a corresponding to the identified section.

If the distance d corresponds to the section A; then, as illustrated in FIG. 4, the filter generating unit 14 sets "1" as the filter coefficient a of the element (i, j) of the coefficient matrix F. In this way, if d<2 is satisfied or if 5≤d<142 is satisfied, that is, if 1.0 mm<λ≤28 mm is satisfied or if 71 mm<λ is satisfied; the filter coefficient a is set to "1" because of a high likelihood of information being included that is used in the extraction of the vein data beginning with the venous vessels.

If the distance d corresponds to the section B; then, as illustrated in FIG. 4, the filter generating unit 14 sets the calculation result of Equation (5) given below as the filter coefficient a of an element (i, j) of the coefficient matrix F. In this way, if 2≤d<5 is satisfied, that is, if 28 mm<λ≤71 mm is satisfied; then the filter coefficient a is set to be the calculation result of Equation (5) given below because of the following reason. Instead of removing all of the low-frequency components in the wavelength band from 28 mm to 71 mm, if some of the low-frequency components, such as about 20% of the low-frequency components, are retained; then it becomes possible to remove the shine while retaining the contour of the palm in a palm image.

$$a=0.54+0.46*\cos((d-2)/(5-2)*2\pi)) \tag{5}$$

If the distance d corresponds to the section C; then, as illustrated in FIG. 4, the filter generating unit 14 sets the calculation result of Equation (6) given below as the filter coefficient a of an element (i, j) of the coefficient matrix F. In this way, if 142≤d<284 is satisfied, that is, if 0.5 mm<λ≤1.0 mm is satisfied; then the filter coefficient a is set to be the calculation result of Equation (6) given below with the aim of enabling a smooth transition of the filter coefficient a from 0 to 1.

$$a=0.5+0.5*\cos((d-142)/(284-142)*\pi \tag{6}$$

If the distance d corresponds to the section D; then, as illustrated in FIG. 4, the filter generating unit 14 sets "0" as the filter coefficient a of an element (i, j) of the coefficient matrix F. In this way, if d≥284 is satisfied, that is, if λ0.5 mm is satisfied; then the filter coefficient a is set to "0" with the aim of removing the wrinkles from the surface of the palm.

The filter generating unit 14 repeats calculating the distance d and setting the filter coefficient a until calculation of the distance d and setting of the filter coefficient a is performed with respect to all elements (i, j) of the coefficient matrix F. Once the filter coefficient a is set with respect to all elements (i, j) of the coefficient matrix F, the filter generating unit 14 registers the coefficient matrix F as the surface reflection reduction filter in the filter storing unit 13.

Returning to the explanation with reference to FIG. 1, the image processing unit 15 is a processing unit that processes a palm image, which serves as an original image, into an image from which the effect of surface reflection is reduced.

The image processing unit 15 includes a converting unit 15a, the filtering unit 15b, and a reverse converting unit 15c.

The converting unit 15a is a processing unit that converts the pixel values of a palm image, which has been corrected by the correcting unit 12, into frequency components. As one mode, the converting unit 15a converts the matrix represented by a palm image into a matrix of frequency components by means of Fourier transform. In addition, the converting unit 15a shifts the matrix of frequency component by an amount equal to a half of the height and a half of the width of the original image in such a way that the center of the matrix represents a low-frequency wave. Meanwhile, herein, although the explanation is given for an example in which an original image is subjected to Fourier transform, it is also possible to implement any other method as long as the image can be converted into the frequency components. For example, instead of Fourier transform, the converting unit 15a can perform fast Fourier transform (FFT) or discrete cosine transform (DCT).

The filtering unit 15b is a processing unit that performs filtering with respect to the frequency components of a palm image, which are obtained by the converting unit 15a by means of conversion, using the surface reflection reduction filter stored in the filter storing unit 13. As one mode, with respect to the frequency components of a palm image, the filtering unit 15b performs filtering by multiplying the value of each element (i, j) of the matrix of frequency components with the filter coefficient a, which is set for each element (i, j) and which constitutes the coefficient matrix F of the surface reflection reduction filter. At that time, prior to the multiplication of the coefficient matrix F, the filtering unit 15b can multiply a window function, such as the hamming window or the Blackman window, to the matrix of frequency components of the palm image. As a result of multiplying such a window function; even when a filter is multiplied as a mask to an image in the frequency space, it becomes possible to reduce the noise attributed to filtering.

The reverse converting unit 15c is a processing unit that converts the frequency components, which have been subjected to filtering by the filtering unit 15b, back into a palm image. As one mode, the reverse converting unit 15c performs inverse Fourier transform with respect to the matrix of frequency components already subjected to filtering, and obtains the palm image already subjected to filtering.

The extracting unit 16 is a processing unit that extracts vein data from a palm image already subjected to filtering. As one mode, from an already-filtered palm image that is obtained by means of reverse conversion by the reverse converting unit 15c, the extracting unit 16 extracts, as pixels capturing the vascular pattern of veins, the pixels that are present on the inward side of the contour of the palm and that have the pixel values equal to or smaller than a predetermined threshold value. In addition, as the vein data, the extracting unit 16 extracts the coordinates of each pixel extracted as part of the vascular pattern of veins or extracts feature quantities such as branch points, lengths between the branch points, and branch angles.

The vein data storing unit 17 is a memory unit used to store vein data. As an example, in the vein data storing unit 17, reference vein data is registered in advance for the purpose of matching with the vein data extracted from the palm image by the extracting unit 16. As another example, the vein data storing unit 17 is referred to by the authenticating unit 18 (described later) during vein authentication for the purpose of matching with the vein data extracted from the palm image by the extracting unit 16. Meanwhile, in the following explanation, the vein data extracted from the palm image by the extracting unit 16 is sometimes written as "input vein data". Moreover, the vein data that is referred to for the purpose of matching with the input vein data and that is stored in the vein data storing unit 17 is sometimes written as "registered vein data".

The authenticating unit 18 is a processing unit that performs authentication by matching the vein data extracted by the extracting unit 16 with the vein data stored in the vein data storing unit 17. As one mode, the authenticating unit 18 reads all sets of registered vein data of users stored in the vein data storing unit 17. Then, the authenticating unit 18 calculates a matching score between the registered vein data of each user and the input vein data. From among the calculated matching scores, if the largest matching score is equal to or greater than a predetermined threshold value; then the authenticating unit 18 determines that vein authentication is successful between the registered vein data having the largest matching score and the input vein data. However, if the largest matching score is less than the predetermined threshold value, then the authenticating unit 18 determines that vein authentication has failed. Herein, the authenticating unit 18 can implement an arbitrary matching method such as the minutia method, the pattern matching method, or the frequency analysis method.

Meanwhile, the correcting unit 12, the filter generating unit 14, the image processing unit 15, the extracting unit 16, and the authenticating unit 18 can be configured using various integrated circuits or electronic circuits. Besides, some of the functional units of the image processing unit 15 can be configured using separate integrated circuits or electronic circuits. Examples of an integrated circuit include an application specific integrated circuit (ASIC). Examples of an electronic circuit include a central processing unit (CPU) and a micro processing unit (MPU).

The filter storing unit 13 and the vein data storing unit 17 can be configured using semiconductor memory elements or memory devices. Examples of a semiconductor memory element include a video random access memory (VRAM), a random access memory (RAM), and a flash memory. Examples of a memory device include a hard disk and an optical disk.

Flow of Operations

Given below is the explanation of a flow of operations performed in the vein authentication device according to the first embodiment. Firstly, the explanation is given about (1) filter generation operation performed in the vein authentication device 10. That is followed by the explanation about (2) vein authentication operation performed in the vein authentication device 10.

(1) Filter Generation Operation

Figure 5:
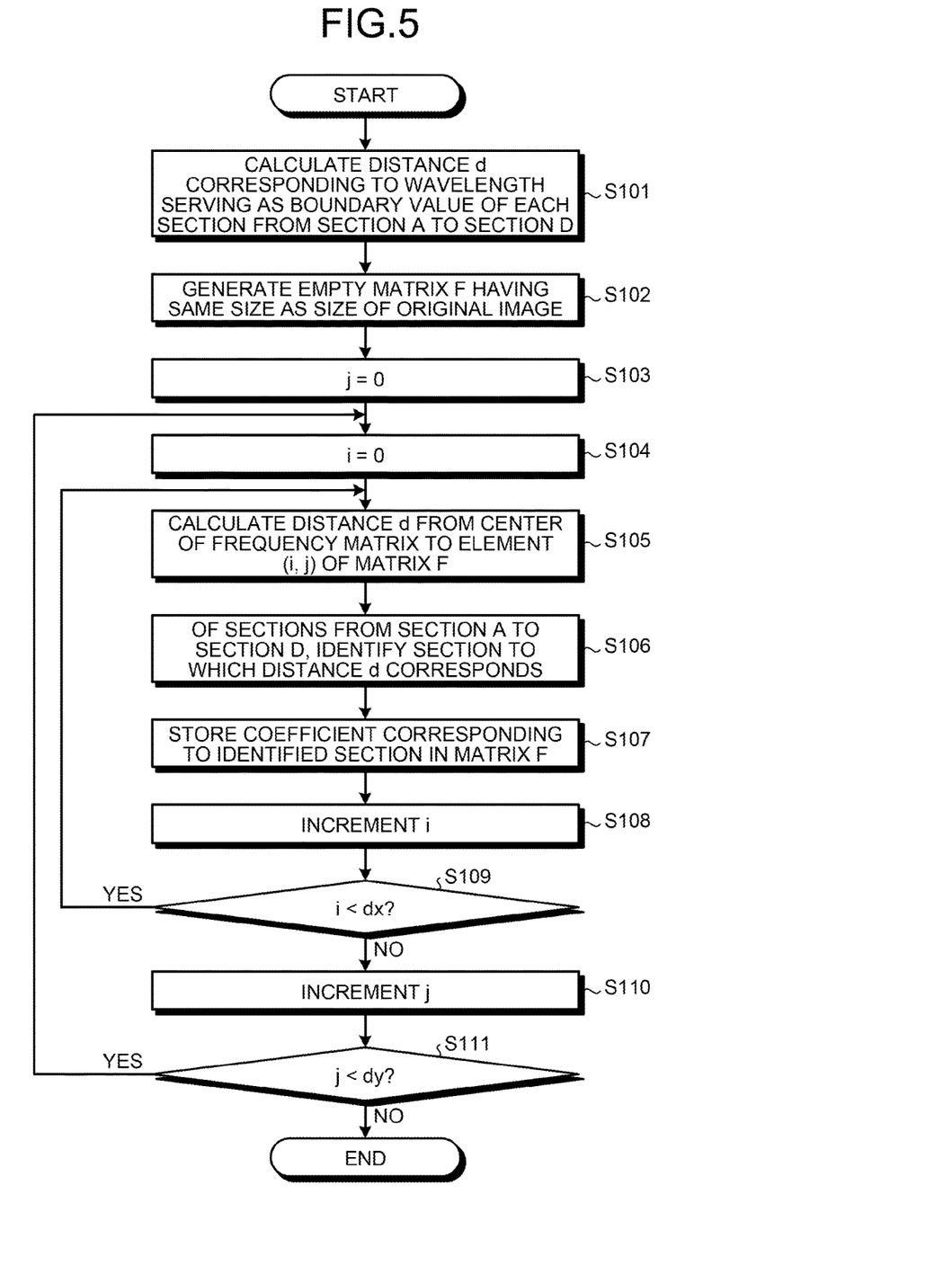
FIG. 5 is a flowchart for explaining a sequence of operations performed during a filter generation operation according to the first embodiment.

FIG. 5 is a flowchart for explaining a sequence of operations performed during a filter generation operation according to the first embodiment. This filter generation operation is triggered by the receipt, via a user interface (not illustrated) or an external device (not illustrated), of a filter generation request in which the image size n of the original image is specified, the proportionality factor k is specified, and the wavelengths λ are specified that serve as the boundary values for defining the shape of the filter.

As illustrated in FIG. 5, firstly, the vein authentication device 10 calculates the distance d corresponding to the wavelength λ serving as the boundary value of each section from the section A to the section D that determine the shape of the filter (Step S101). Then, the vein authentication device 10 generates an empty coefficient matrix F having the same size as the size of the original image (Step S102). Subsequently, the vein authentication device 10 resets a Y-direction parameter j to "0" (Step S103) and resets an X-direction parameter i to "0" (Step S104).

Then, using Equation (1) given above, the vein authentication device 10 calculates the distance d from the center of the coefficient matrix F to an element (i, j) of the coefficient matrix F (Step S105). Then, the vein authentication device 10 identifies the section from among the section A to the section D to which the calculated distance d corresponds (Step S106).

Subsequently, in the element (i, j) of the coefficient matrix F, the vein authentication device 10 sets the filter coefficient a corresponding to the identified section (Step S107). Then, the vein authentication device 10 increments the X-direction parameter i (Step S108) and determines whether or not the incremented X-direction parameter i is smaller than an X-direction image size dx (Step S109).

If the incremented X-direction parameter i is smaller than the X-direction image size dx (Yes at Step S109), then it can be determined that the scanning in the X-direction is not yet completed. Consequently, the vein authentication device 10 repeats the operations from Step S105 to Step S108 with respect to the element (i+1, j) of the coefficient matrix F.

On the other hand, if the incremented X-direction parameter i is equal to the X-direction image size dx (No at Step S109), then it can be determined that the scanning in the X-direction is completed. In that case, the vein authentication device 10 increments the Y-direction parameter j (Step S110).

Then, the vein authentication device 10 determines whether or not the incremented Y-direction parameter j is smaller than a Y-direction image size dy (Step S111). If the incremented Y-direction parameter j is smaller than the Y-direction image size dy (Yes at Step S111), then it can be determined that the scanning in the Y-direction is not yet completed.

In that case, the vein authentication device 10 resets the X-direction parameter i to "0" (Step S104) and repeats the operations from Step S105 to Step S110 with respect to the element (0, j+1) of the coefficient matrix F.

On the other hand, if the incremented Y-direction parameter j is equal to the Y-direction image size dy (No at Step S111), then it can be determined that the scanning in the Y-direction is completed. That marks the end of the operations.

(2) Vein Authentication Operation

Figure 6:
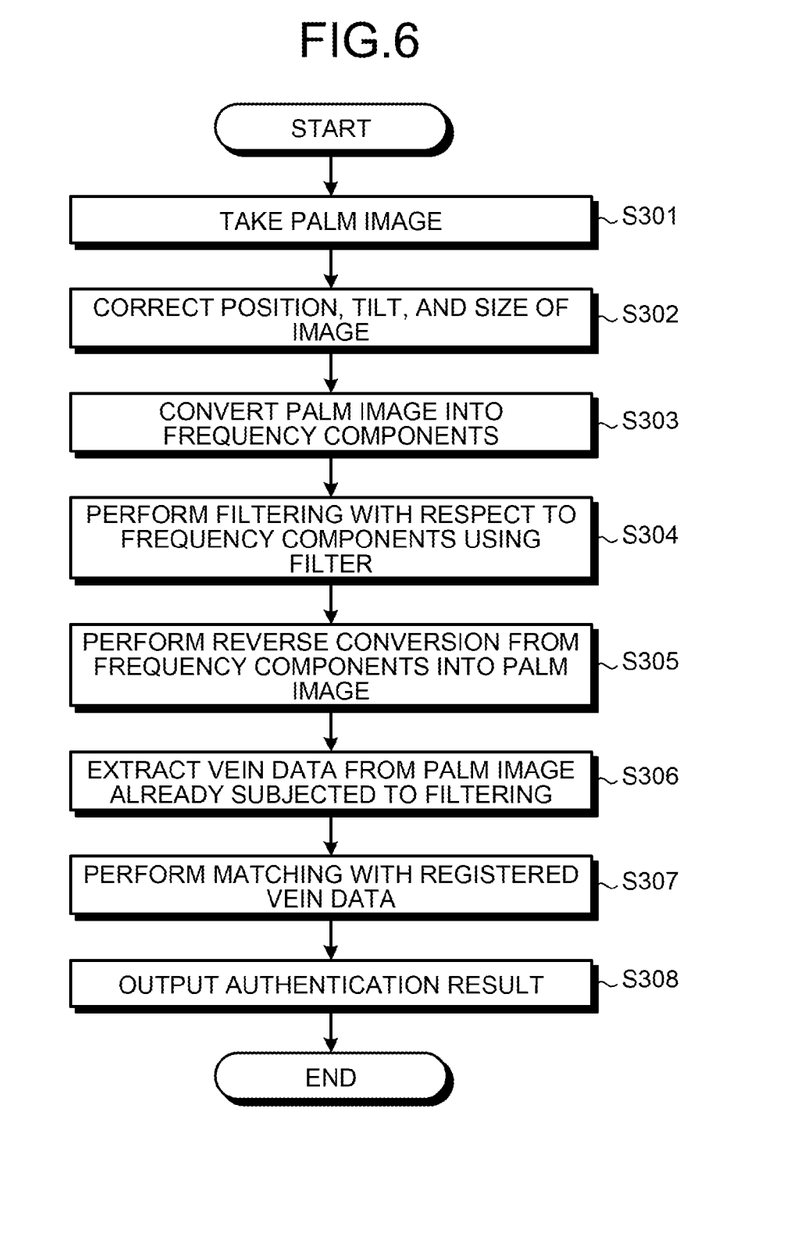
FIG. 6 is a flowchart for explaining a sequence of operations performed during a vein authentication operation according to the first embodiment.

FIG. 6 is a flowchart for explaining a sequence of operations performed during a vein authentication operation according to the first embodiment. This vein authentication operation is triggered when the imaging unit 11 takes a palm image.

As illustrated in FIG. 6, once a palm image is taken (Step S301), the vein authentication device 10 corrects the position, the tilt, and the size of the palm image (Step S302). Then, the vein authentication device 10 converts the matrix represented by the palm image into a matrix of frequency components by means of Fourier transform (Step S303).

Subsequently, the vein authentication device 10 performs filtering with respect to the frequency components of the palm image by multiplying the value of each element (i, j) of the frequency components with the filter coefficient a that is set for each element (i, j) and that constitutes the coefficient matrix F of the surface reflection reduction filter (Step S304).

Then, the vein authentication device 10 performs inverse Fourier transform with respect to the matrix of frequency components already subjected to filtering, and obtains the palm image already subjected to filtering (Step S305).

Subsequently, the vein authentication device 10 extracts vein data from the palm image already subjected to filtering (Step S306).

Then, the vein authentication device 10 matches the input vein data, which is the vein data extracted from the currently-taken palm image, with the registered vein data stored in the vein data storing unit 17 (Step S307). Subsequently, the vein authentication device 10 outputs the authentication result to a display unit (not illustrated), or to a voice output unit (not illustrated), or to an external device (not illustrated) (Step S308). That marks the end of the operations.

Effect of First Embodiment

As described above, in the vein authentication device 10 according to the first embodiment, a frequency filter is applied to a palm image taken by the imaging unit 11 for the purpose of removing the frequency components corresponding to the uneven distribution of surface reflection and corresponding to the patterns present on the surface. For that reason, in the vein authentication device 10 according to the first embodiment, in order to reduce the effect of surface reflection, neither it is necessary to have the camera and the light source placed excessively distant from each other nor it is necessary to use an optical filter nor it is necessary to dispose a plurality of illuminations and a plurality of cameras. Hence, in the vein authentication device 10 according to the first embodiment, it becomes possible to achieve downsizing of the device and achieve a low manufacturing cost while achieving reduction in the effect of surface reflection.

[b] Second Embodiment

Till now, the explanation is given about the embodiment related to the device laid open in this application. However, the invention is not only limited to the embodiment described above, and it is possible to have various different illustrative embodiments. There, given below is the explanation of other embodiments of the invention.

Client Server

For example, in the first embodiment, the explanation is given about an example in which vein authentication is performed in stand-alone mode. However, it is not always necessary to perform operations in stand-alone mode. Alternatively, for example, it is also possible to perform vein authentication in a client-server environment. For example, instead of obtaining a palm image from the imaging unit 11, the device laid open in this application can obtain a palm image via a network such as the Internet or a local area network (LAN).

Assistance at Time of Registration of Vein Data

In the first embodiment described above, the explanation is given about an example in which a surface reflection reduction filter is applied to a palm image taken by the imaging unit 11. However, the scope of application of the device laid open in this application is not limited to that example. Alternatively, for example, in a situation in which the vein data of a user is to be registered in the vein data storing unit 17, the vein data is extracted after applying a surface reflection reduction filter to the palm image that is used in extracting the vein data, and then the extracted vein data is registered in the vein data storing unit 17.

Authentication Method

In the first embodiment described above, the explanation is given for an example of performing 1:N authentication in which a single set of input vein data is matched with a plurality of sets of registration vein data. However, the scope of application of the device laid open in this application is not limited to that example. Alternatively, it is also possible to perform 1:1 authentication. In the case of performing 1:1 authentication, for example, identification information for identifying a user, such as a user ID, is obtained from a user interface (not illustrated) or an IC card reader (not illustrated); and the registered vein data corresponding to that user ID can be read from the vein data storing unit 17.

Other Sources of Palm Image

In the first embodiment described above, the explanation is given for an example in which a palm image is taken by the imaging unit 11. However, the source of a palm image is not limited to that example. Alternatively, for example, the device laid open in the application can obtain a palm image from a memory medium such as a memory card or a universal serial bus (USB) thumb drive.

Installation Example

For example, the device laid open in this application can be installed in an arbitrary device capable of performing vein authentication such as a computer that performs login authentication, a server device connected to that computer, an automatic teller machine (ATM) that performs personal authentication, or a terminal device or a server device of an entrance-exit unlocking system.

Separation and Integration

The constituent elements of the devices illustrated in the drawings are merely conceptual, and need not be physically configured as illustrated. The constituent elements, as a whole or in part, can be separated or integrated either functionally or physically based on various types of loads or use conditions. For example, the correcting unit 12, the filter generating unit 14, the image processing unit 15, the extracting unit 16, or the authenticating unit 18 can be connected via a network as an external device of a vein authentication device. Alternatively, the correcting unit 12, the filter generating unit 14, the image processing unit 15, the extracting unit 16, or the authenticating unit 18 can be installed in a separate device that is connected via a network and that operates in a coordinated manner so as to implement the functions of the vein authentication device described above.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A vein authentication method comprising:
   converting into frequency components, pixel values of an image of an authentication site including veins, using a processor;
   filtering, using the processor, the frequency components obtained at the converting of the pixel values, according to a filter stored in a storage for reducing, from among low-frequency components having a lower spatial frequency than the spatial frequency of the veins and high-frequency components having a higher spatial frequency than the spatial frequency of the veins, frequency components corresponding to surface reflection of an illumination used for the authentication site, the filter having a filter coefficient that is used for multiplication in a section of the low-frequency components and that is set to a value that forms a downwardly convex parabola in the section;
   reverse-converting, using the processor, the filtered frequency components back into an image;
   extracting from the image obtained at the reverse-converting, vein data representing a vascular pattern of veins, using the processor; and
   performing, using the processor, vein authentication using the extracted vein data, wherein
   the filtering includes filtering the frequency components according to a filter for reducing low-frequency components that have a lower spatial frequency than the spatial frequency of the veins and that correspond to surface reflection of the illumination which is unevenly distributed on the authentication site, wherein
   the low-frequency components indicate the frequency components which have a lower spatial frequency than the spatial frequency of width of venous vessels, and correspond to the surface reflection which is unevenly distributed at a specific position of a palm.

2. The vein authentication method according to claim 1, wherein the filtering includes filtering the frequency components according to a filter for reducing high-frequency components that have a higher spatial frequency than the spatial frequency of the veins and that correspond to a pattern on the surface of the authentication site.

3. The vein authentication method according to claim 1, wherein the filter coefficient stored in the storage is a value for retaining a part of components in a wavelength band from 28 mm to 71 mm.

4. An image processing method comprising:
   converting into frequency components, pixel values of an image of an authentication site including veins, using a processor;
   filtering, using the processor, the frequency components obtained at the converting of the pixel values, according to a filter stored in a storage for reducing, from among low-frequency components having a lower spatial frequency than the spatial frequency of the veins and high-frequency components having a higher spatial frequency than the spatial frequency of the veins, frequency components corresponding to surface reflection of an illumination used for the authentication site, the filter having a filter coefficient that is used for multiplication in a section of the low-frequency components and that is set to a value that forms a downwardly convex parabola in the section; and
   reverse-converting, using the processor, the filtered frequency components back into an image, wherein
   the filtering includes filtering the frequency components according to a filter for reducing low-frequency components that have a lower spatial frequency than the spatial frequency of the veins and that correspond to surface reflection of the illumination which is unevenly distributed on the authentication site, wherein
   the low-frequency components indicate the frequency components which have a lower spatial frequency than the spatial frequency of width of venous vessels, and correspond to the surface reflection which is unevenly distributed at a specific position of a palm.

5. The image processing method according to claim 4, wherein the filtering includes filtering the frequency components according to a filter for reducing high-frequency components that have a higher spatial frequency than the spatial frequency of the veins and that correspond to a pattern on surface of the authentication site.

6. A vein authentication device comprising:
a memory that stores a filter for reducing, from among low-frequency components having a lower spatial frequency than the spatial frequency of veins and high-frequency components having a higher spatial frequency than the spatial frequency of veins, frequency components corresponding to surface reflection of an illumination used for an authentication site including the veins, the filter having a filter coefficient that is used for multiplication in a section of the low-frequency components and that is set to a value that forms a downwardly convex parabola in the section; and
a processor coupled to the memory, wherein the processor executes a process comprising:
converting into frequency components, pixel values of an image of the authentication site;
filtering the frequency components at the converting of the pixel values, using the filter stored in the memory;
reverse-converting the filtered frequency components back into an image;
extracting from the image obtained at the reverse converting, vein data representing a vascular pattern of veins; and
performing vein authentication using the extracted vein data, wherein
the filtering includes filtering the frequency components according to a filter for reducing low-frequency components that have a lower spatial frequency than the spatial frequency of the veins and that correspond to surface reflection of the illumination which is unevenly distributed on the authentication site, wherein
the low-frequency components indicate the frequency components which have a lower spatial frequency than the spatial frequency of width of venous vessels, and correspond to the surface reflection which is unevenly distributed at a specific position of a palm.

7. The vein authentication device according to claim 6, wherein the filtering includes filtering the frequency components according to a filter for reducing high-frequency components that have a higher spatial frequency than the spatial frequency of the veins and that correspond to a pattern on surface of the authentication site.

* * * * *